Patented Dec. 19, 1933

1,940,174

UNITED STATES PATENT OFFICE 1,940,174

TUBERCLE WAXES AND A PROCESS FOR MAKING THEM

Carl Ludwig Lautenschläger, Frankfort-on-the-Main, Germany, assignor to Winthrop Chemical Company, Inc., New York, N. Y., a corporation of New York No Drawing. Application May 5, 1928, Serial No. 275,551, and in Germany March 30, 1927

3 Claims. (Cl. 167—79)

The present invention relates to tubercle waxes free from any tubercle bacilli and from tuberculin and to a process for making them.

Tubercle waxes obtained from tubercle bacilli can produce a very favorable action upon the various forms of lepra, if the residual parts of tubercle bacilli and toxins which are always still left in the said waxes are eliminated; such elimination has not been possible by methods hitherto known. The tubercle bacilli still adhering to the waxes frequently give rise to focus- and general-reactions caused by autolytic processes, which reactions, of course, very much affect the suitability of the waxes in question for therapeutic purposes.

This invention is based on the discovery of a simple way of preparing tubercle waxes which are free from any tubercle bacilli and tubercle toxins, by digesting the waxes with a dilute acid, after having deprived them of fatty matter and freed them from the greater part of the tubercle bacilli by one of the usual methods. The waxes thus treated are then dissolved in a suitable organic solvent wherein they easily pass into solution; to this solution is added an organic solvent which dissolves the tubercle waxes with difficulty or not at all, whereby the waxes are caused to precipitate while the impurities remain dissolved. By repeating this procedure several times, the waxes are further purified.

For example, tubercle wax produced from 100 grams of killed tubercle bacilli of any origin is digested at water-bath temperature for a prolonged time with a dilute acid (of about 5 per cent strength). After cooling, the wax is separated from the aqueous liquid and digested several times with warm water. The wax is then dissolved in ether and, after the solution has been dried by means of sodium sulfate, the pure wax is precipitated from the solution by a suitable organic solvent, for instance, acetone or alcohol.

The product may be administered by intravenous or subcutaneous injection of a 0.1% aqueous suspension of the purified tubercle wax.

I claim:

1. A process for making tubercle waxes free from any tubercle bacilli and tuberculin, which consists in digesting the waxes, after having freed them from the greater part of the tubercle bacilli and the fatty matter, with a dilute acid and then further purifying them by repeated dissolution by means of organic solvents insoluble in water and precipitation by means of water-soluble organic solvents.

2. A process for making tubercle waxes free from any tubercle bacilli and tuberculin, which consists in digesting the waxes, after having freed them from the greater part of the tubercle bacilli and the fatty matter, with a dilute acid, while heating, and then further purifying them by repeated dissolution by means of organic solvents insoluble in water and precipitation by means of water-soluble organic solvents.

3. A process for making tubercle waxes free from any tubercle bacilli and tuberculin, which consists in digesting the waxes after having freed them from the greater part of the tubercle bacilli and the fatty matter, with a dilute acid, while heating on the water bath, and then further purifying them by repeated dissolution in ether and following precipitation with alcohol.

CARL LUDWIG LAUTENSCHLÄGER.